United States Patent [19]

Ohta

[11] Patent Number: 4,873,537
[45] Date of Patent: Oct. 10, 1989

[54] IMAGE RECORDING APPARATUS FOR PRODUCING A PLURALITY OF PULSE WIDTH MODULATED SIGNALS ON THE BASIS OF IMAGE DATA

[75] Inventor: Shinichi Ohta, Tokyo, Japan

[73] Assignee: Canon Kabushiki Kaisha, Tokyo, Japan

[21] Appl. No.: 325,030

[22] Filed: Mar. 20, 1989

Related U.S. Application Data

[63] Continuation of Ser. No. 225,644, Jul. 27, 1988, abandoned, which is a continuation of Ser. No. 870,421, Jun. 4, 1986, abandoned.

[30] Foreign Application Priority Data

| Jun. 8, 1985 [JP] | Japan | 60-123520 |
| Jun. 8, 1985 [JP] | Japan | 60-123521 |
| Jun. 8, 1985 [JP] | Japan | 60-123522 |
| Oct. 30, 1985 [JP] | Japan | 60-245231 |

[51] Int. Cl.$^4$ ............................................. G01D 9/42
[52] U.S. Cl. ..................................... 346/108; 358/296
[58] Field of Search ................... 346/108, 107 R, 160, 346/76 L; 358/296, 298, 300, 302

[56] References Cited

U.S. PATENT DOCUMENTS

| 3,461,229 | 8/1969 | Oppenheimer | 178/6.6 |
| 3,882,270 | 5/1975 | Ogawa | 178/7.1 |
| 3,911,480 | 10/1975 | Brucker | 358/75 |
| 3,916,096 | 10/1975 | Everett et al. | 178/6.6 |
| 3,965,290 | 6/1976 | Tisue | 178/6 |
| 4,040,094 | 8/1977 | Everett et al. | 358/283 |
| 4,149,183 | 4/1979 | Pellar et al. | 358/75 |
| 4,196,451 | 4/1980 | Pellar | 358/283 |
| 4,245,258 | 1/1981 | Holladay | 358/283 |
| 4,251,821 | 2/1981 | Kimura | 346/108 |
| 4,375,064 | 2/1983 | Ohara | 346/108 |
| 4,386,272 | 5/1983 | Check, Jr. et al. | 358/298 X |
| 4,389,712 | 6/1983 | Frattarola et al. | 358/298 X |
| 4,395,766 | 7/1983 | Ohnishi et al. | 358/298 X |
| 4,445,408 | 5/1984 | Keith | 83/37 |
| 4,463,364 | 7/1984 | Tamura | 346/160 |
| 4,467,367 | 8/1984 | Ohara et al. | 358/298 |
| 4,507,685 | 3/1985 | Kawamura | 358/75 |
| 4,553,173 | 11/1985 | Kawamura | 358/298 X |
| 4,626,923 | 12/1986 | Yoshida | 358/283 |

FOREIGN PATENT DOCUMENTS 50-17919 2/1975 Japan .
2120896 12/1983 United Kingdom .

OTHER PUBLICATIONS

IBM Technical Disclosure Bulletin, vol. 20, No. 1, Jun. 1977, pp. 31–32.

Primary Examiner—E. A. Goldberg
Assistant Examiner—Mark Reinhart
Attorney, Agent, or Firm—Fitzpatrick, Cella, Harper & Scinto

[57] ABSTRACT

An image beam recording apparatus including an image data input device, a comparator for forming a plurality of pulse width modulated signals on the basis of the image data input by the input device, and a laser for scanning a laser beam modulated in accordance with the pulse width modulated signals output by the comparator and for recording an image on a recording medium. The comparator is capable of forming a plurality of pulse width modulated signals so as to reproduce a variable density image. The plurality of pulse width modulated signals have the same number of pulses, but different pulse widths. The laser effects a scanning operation so that a plurality of beams modulated by the pulse width modulated signals form spots which overlap each other.

24 Claims, 19 Drawing Sheets

FIG. 3
PRIOR ART

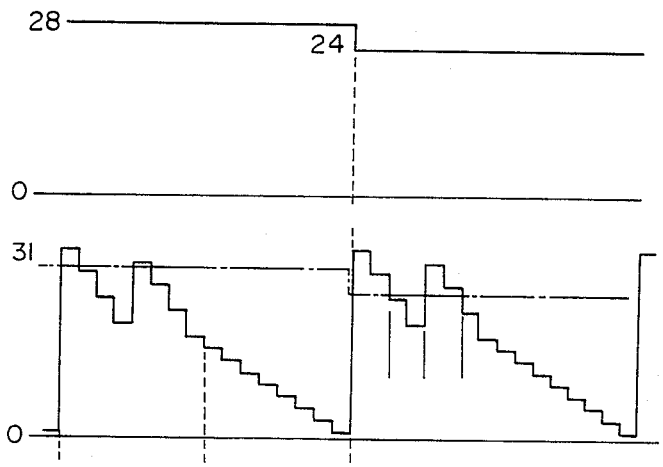
FIG. 16A
FIG. 16B
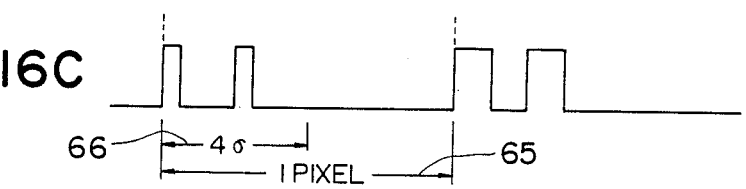
FIG. 16C

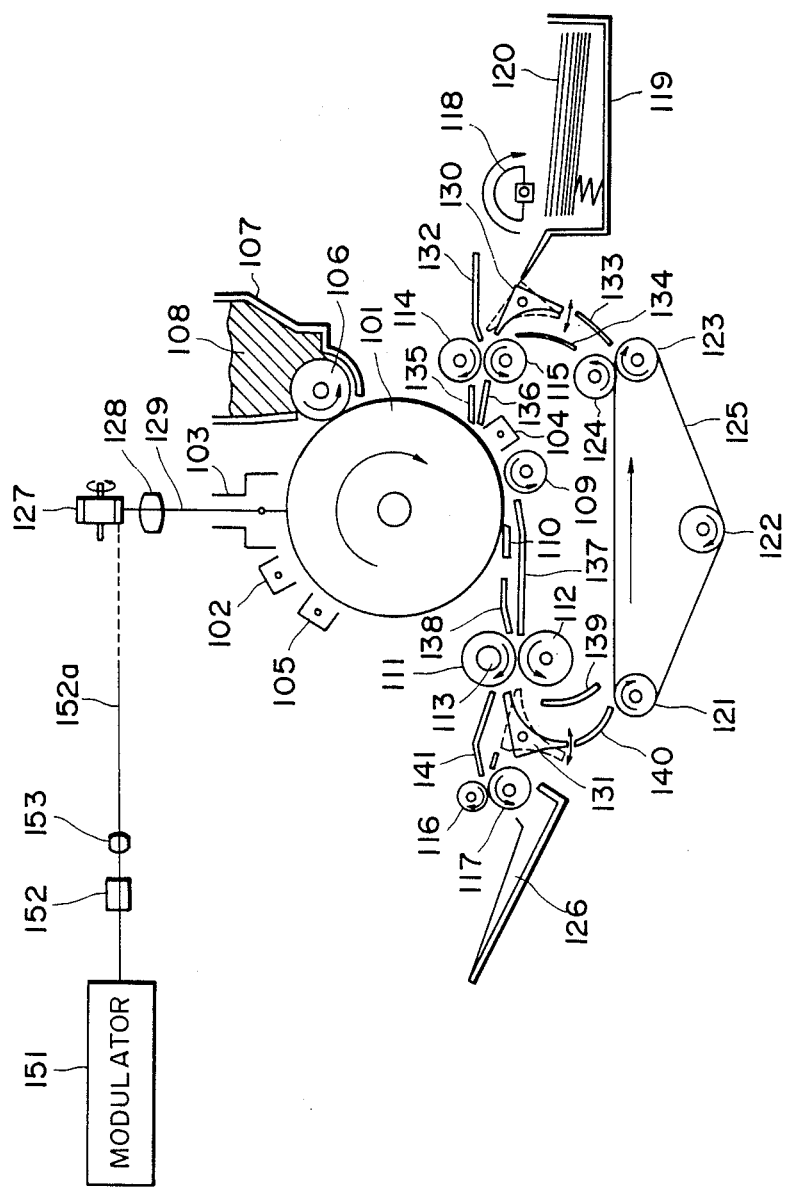

IMAGE RECORDING APPARATUS FOR PRODUCING A PLURALITY OF PULSE WIDTH MODULATED SIGNALS ON THE BASIS OF IMAGE DATA

This application is a continuation, of application Ser. No. 07/225,644 filed July 27, 1988, now abandoned, which was a continuation of application Ser. No. 06/870,421 filed June 4, 1986, now abandoned.

BACKGROUND OF THE INVENTION

1. Field of the Invention

The present invention relates to a recording apparatus for recording an intermediate tone image.

2. Related Background Art

For reproducing an intermediate tone image in a pseudo manner with a recording apparatus poor in intermediate tone reproducing capability, there is already proposed and practiced the so-called dither method, the density pattern method, etc. These methods will not be explained in detail as they are the subject of various patent applications such as the Japanese Patent Laid-open 79677/1982 and are detailedly explained in detail in various references. These methods try to increase the number of density levels within a limited matrix size.

In the conventionally employed method, an intermediate tone image signal (image density signal) is compared with a threshold value signal (dither signal) for conversion into a binary signal or a multi-value signal of limited levels, and the intermediate tone is reproduced in a pseudo manner by the size or density of various dot.

In the case of using a threshold signal in the form of a 4×4 matrix, a recording apparatus capable of only reproducing two density levels can only reproduce 17 density levels. Consequently the density difference between the neighboring levels is large, so that the obtained image will have distinct pseudo contours. On the other hand, if the matrix is made larger for avoiding such a drawback, there will be a loss in the resolving power.

On the other hand, in a recording apparatus capable of recording plural density levels, it has been tried to increase the number of density levels by the use of plural density levels while maintaining a constant matrix size. For example, in an ink jet printer, the multiple density levels can be achieved by the size of the dots or the density of ink, and, in an electrophotographic laser beam printer, the multiple density levels can be attained by dividing the matrix in the main scanning direction and conducting pulse width modulation, as disclosed in the Japanese Patent Laid-open 99864/1982.

However, it has been difficult to render the density difference per level too small to be perceived because, in case of the ink jet printer, the number or dot sizes or ink densities is inevitably limited, or, in case of the electrophotographic laser beam printer, the pulse frequency inevitably has a practical limit.

In the following there will be explained the conventional art of the electrophotographic laser beam printer.

FIG. 1 is a block diagram of a conventional electrophotographic laser beam printer, employing the dither method or density method for achieving multiple density levels. Its structure and the function will now be explained.

An image memory 21, for storing intermediate tone image data of 6 bits per pixel, receives addressing pixel data N1, designated by an address counter 22 for counting clock pulses CP and a main scanning synchronization signal (horizontal synchronization signal) BD to be explained later. A look-up table 23 converts the tone characteristic of the pixel data N1 into linearly corrected pixel data N2 and supplies the same to a digital comparator 24. The look-up table 23 effects a (N1–N2) conversion by adapting the pixel data N1 to a different address. The digital comparator 24 also receives an output T from a memory 31, storing a threshold value matrix, and compares the two input signals to release a binary signal V, which is used for driving a semiconductor laser 26 through an amplifier 25. A light beam emitted by the semiconductor laser 26 is reflected by a rotary polygonal mirror 27, rotated as indicated by an arrow, and effects main scanning on a photosensitive drum 28. The drum 28 is rotated in a direction as indicated by an arrow for sub scanning, and two-dimensional scanning is achieved in this manner. A latent image is formed on the drum 28 through an unshown electrophotographic process combined with the scanning with the beam I, and image recording is effected by image development with toner, image transfer and image fixing. A part of the beam I is reflected by a mirror 29, and enters a photodetector 30 to obtain the main scanning synchronization signal BD.

The memory 31 is composed of a matrix of 16×4, of which the column address in the main scanning direction is designated by a 16-bit column address counter 32 for counting the clock pulses CP, while the row address in the sub-scanning direction is designated by a 4-bit row address counter 33 for counting the main scanning synchronization signal BD. Consequently a pixel stored in the image memory 21 is converted into a density pattern corresponding to the entire memory 31, if the address counter 22 designates a pixel succession in the main scanning direction at every 16 counts of the clock pulses CP and in the sub-scanning direction at every 4 counts of the synchronization signals BD. On the other hand, if the address counter 22 renews the address at every 8 counts of the clock pulses CP and at every 2 counts of the synchronization signal BD, each pixel corresponds to ¼ of the memory 31 to achieve an intermediate state between the dither method and the density pattern method. Such state is disclosed in detail in the Japanese Patent Laid-open 99867/1982.

In the present example in which each pixel contains data of 6 bits, the image data N1, N2 and the output T respectively assume a value from 0 to 63, and, when the level of the pixel data N2 is higher than that of the output T, the binary signal V assumes a level "1" to activate the semiconductor laser 26. However, the density characteristic of the obtained image depends on the arrangement of the threshold values in the memory 31, the emission intensity of the semiconductor laser 26, the electrophotographic process employed, etc.

FIG. 2 is a chart showing the relationship between the pixel data N1, N2 and the output image density D, wherein a curve (a) indicates the density D obtained from the pixel data N1 without using the look-up table 23, while a curve (b) indicates the density D obtained from the pixel data N2 after going through the look-up table 23. The ordinate represents the output image density, while the abscissa represents the pixel data. The output density for each pixel data changes stepwise for each pulse.

As will be seen in the curve (a), in the absence of slope correction, the change in the density is steeper in the low density range and slower in the high density range due to a large beam diameter. The maximum density difference per level $\Delta D_{max}$ appears between the level 5 and 6 of the pixel data N1. In actual measurement, $\Delta D_{max}=D_2-D_1=0.08$. The human ability of perceiving a density difference is considered to be in a range of 0.01. Consequently a density difference of 0.08 is clearly perceivable. Thus the tonal characteristic of the output image is observed stepwise, with so-called pseudo contours. In this manner the tonal rendition is significantly deteriorated. Consequently the characteristic (a) cannot be considered acceptable in terms of tonal rendition. On the other hand, the curve (b) shows a case of correcting the tonal characteristic linearly. For example the levels 11–14 of the data N1 are converted to a level 5 in the data N2, and the levels 15–18 are converted to a level 6. This conversion expands a steep portion of the curve (a) and compresses a non-steep portion. Consequently this conversion converts a pixel data to the data N2 or the curve (b).

However, such conversion does not change the maximum density difference per level $\Delta D_{max}$, so that the tonal rendition is still unsatisfactory due to the presence of distinct pseudo-contours. This phenomenon becomes evident in a steep portion of the curve (a) or (b), thus deteriorating the tonal rendition in the portion.

Now reference is made to FIGS. 3A-3D and 4 for explaining the exposure distribution characteristic of a laser beam and the density distribution characteristic of an obtained image.

FIGS. 3A to 3D show waveforms for the explaining exposure distribution characteristic of the conventional pulse width modulation. FIG. 3A shows a laser driving pulse, and the laser beam is emitted when the pulse is at the state "1".

FIG. 3B shows the distribution of the intensity I of the laser beam along the ordinate, as a function of distance along the abscissa, and the distribution can be ordinarily approximated by a Gaussian distribution.

Thus, when normalized at the central intensity, the laser beam intensity I can be represented by:

$$I = exp(-x^2/2\sigma^2) \quad (1)$$

wherein x is the distance from the center, and $\sigma$ is the standard deviation in the Gaussian distribution.

The diameter of a laser beam is usually represented by a half-value width, i.e. a width where the intensity falls to ½ of the central intensity, or by a width where the intensity falls to $1/e^2$ of the central intensity. In the present text the latter method is adopted. Thus the diameter becomes equal to $4\sigma$ shown in FIG. 3B. The laser beam scans at a speed v in a direction of the arrow at the lower right portion of FIG. 3B. Thus the scanning distance is represented by:

$$L = vT \quad (2).$$

If the scanning speed is constant, L and T are equivalent so that FIGS. 3A and 3B can be viewed with a same scale.

FIG. 3C shows the intensity distributions, respectively in full line and broken line, at points Q and S, and FIG. 3D shows the distributions of exposure, by curves (a) and (b), respectively corresponding to exposure times T1 and T2.

The above-explained apparatus functions in the following manner.

It is assumed that the laser beam is turned on at P and off at Q, corresponding to a period T1 shown in FIG. 3A. Thus the intensity distribution immediately after the laser beam is turned on at P corresponds to FIG. 3B, while that immediately before the beam is turned off at Q corresponds to the full-lined curve in FIG. 3C. Consequently the beam intensity at P varies from the intensity I in FIG. 3B (center P) to the intensity in FIG. 3C (center Q), and the amount of exposure Ep at the point P is represented by:

$$E_P = \int_0^{P-Q} I dx \quad (3)$$

wherein P-Q is the distance between the points P and Q.

Similarly the amount of exposure $E_Q$ at Q which is symmetrical to P in the Gaussian distribution is represented by:

$$E_P = E_Q \quad (4).$$

Also the amount of exposure $E_R$ at a central point R between P and Q is given by:

$$E_R = \int_0^{P-R} I dx + \int_{R-Q}^{0} I dx = 2\int_0^{P-R} I dx \quad (5)$$

In this manner the distribution of exposure when the laser beam is turned on for a period T1 is represented by the curve (a) in FIG. 3D.

Also if the laser beam shown in FIG. 3A is turned on for a double period T2 (=2T1), the intensity distribution immediately before it is turned off assumes a form represented by the broken-lined curve in FIG. 3C, and the amount of exposure at P becomes equal to the area hatched with horizontal lines in FIG. 3C. The exposure distribution in this case is represented by the curve (b) in FIG. 3D, and the center of the exposure distribution is shifted from R to Q.

FIG. 4 shows a density characteristic corresponding to the exposure distribution shown in FIG. 3D, wherein the first quadrant indicates the output density D along the scanning function in ordinate as a function of the distance L along the abscissa. The second quadrant shows the density along the ordinate as a function of the amount of exposure E in a recording system, for example an electrophotographic process. The electrophotographic process may be designed as an image scanning process, in which the density is higher for a larger exposure, or a background scanning process, in which the density is lower for a larger exposure, and the former is adopted in this case. The third quadrant shows the exposure distribution shown in FIG. 3D, wherein abscissa indicates the distance L.

The exposure distribution shown in the third quadrant provides a visible image of the density distribution shown in the first quadrant, relying on the E-D characteristic shown in the second quadrant. Curves (a) and (b) in the first quadrant correspond to those in FIG. 3D, respectively indicating the density distributions for the beam turn-on periods T1, T2. The average density is obtained by integrating a three-dimensional distribution obtained from the distribution in the first quadrant and from the distribution in the scanning direction, divided by unit area. However, the two-dimensional distribution will not be considered since two-dimensional consideration in the scanning and orthogonal directions is quite complex while one-dimensional consideration in the scanning direction alone is sufficient for qualitative understanding. In such one-dimensional consideration, a value obtained by integrating the waveform shown in the first quadrant and dividing by the distance can be considered equivalent to the average density. The area ratio in the first quadrant is not equal to the ratio of the beam turn-on periods due to the non-linearity of the E-D characteristic, but it will be understood that the density becomes higher and the dot diameter becomes larger as the laser beam is turned on longer.

Also it will be understood that, due to the narrow latitude of the electrophotographic process, a beam turn-on period longer than T2 results in the density saturation and gives rise to an increase in the dot diameter as represented by a curve (c) in the first quadrant.

As explained in the foregoing, it has been tried to obtain multiple density levels, utilizing the narrow latitude of the electrophotographic process. However, in the formation of a black dot in a highlight area as shown by the curves (a) and (b) in the first quadrant in FIG. 4, there results a black dot having a small area but a nearly saturated density, as represented by the curve (b). Such a black dot, being smaller in area than the white area and having a high density, is quite conspicuous, thus giving a coarse impression in the high-light area of the image.

In certain apparatus such as the electrophotographic laser beam printer, the main scanning is effected by deflecting the laser beam with a rotary polygonal mirror, while the sub scanning is effected by the rotation of a photosensitive drum. The limitation in the working precision and mounting precision of the rotary polygonal mirror results in unevenness in the main scanning, while the limitation in the precision of rotation of the photosensitive drum results in fluctuation in the rotation, thus giving rise to fluctuation in density in the sub scanning direction.

In the following there will be explained a process by which a fluctuation in scanning results in a fluctuation in density, in an electrophotographic laser beam printer.

The average exposure E per unit length in the sub scanning direction is given by:

$$E = I \cdot T_H \cdot N \quad (6)$$

wherein I is the laser beam intensity, $T_H$ is the main scanning time, and N is the average number of scanning lines per unit length in the sub scanning direction. In the presence of a fluctuation in the main scanning or rotation, the number N of scanning lines fluctuates by $\Delta N$, and the variation $\Delta E$ in exposure is given by:

$$\Delta E = I \cdot T_H \cdot \Delta N \quad (7)$$

In actual image recording, the intensity I is modulated. However, if I is assumed to be constant in order to consider the fluctuation, there will result $\Delta E \alpha \Delta N$ because the main scanning time $T_H$ is constant.

In the electrophotographic process, an exposure of the photosensitive drum results in a potential latent image, which is converted into an image density through the steps of development with toner, image transfer and image fixing, but the relationship between the amount of exposure and the image density is generally non-linear. Though the electrophotographic process is provided with a narrow latitude, the characteristic can be partly approximated by a linear line. For the simplicity of explanation, the density is approximated as proportional to N, so that $\Delta D \alpha \Delta N$.

Consequently there is obtained a relation:

$$\Delta D/D \alpha \Delta N/N \quad (8)$$

The average or effective value $\Delta N_{RMS}$ of $\Delta N$ is determined by the precision of the hardware and can be considered almost constant. Since N is constant, the ratio of $\Delta N_{RMS}$ and N is also constant and assumed as Cv. Thus the effective value $\Delta D_{RMS}$ of $\Delta D$ has a relation:

$$\Delta D_{RMS} \alpha C_v \cdot D \quad (9)$$

thus the fluctuation in density is proportional to the average density. As the amount of exposure is not proportional to the density in practice, the relation (9) does not stand in a strict sense, but it will be understood that the fluctuation in density becomes larger for a higher average density. However, since the density becomes saturated in excess of a certain exposure, the density does not vary even if the amount of exposure varies. Therefore, in the case of reproducing the intermediate tone with binary levels of black and white, the fluctuation in density does not appear if the laser beam intensity is elevated to saturate the density. However the laser beam intensity distribution is not rectangular but is close to a Gaussian distribution, and the exposure distribution in the main scanning direction is given by the integration of the Gaussian curve passing through each point, having a prolonged sloping portion. Thus, if the laser beam is turned off only for a brief period, the exposure is not reduced to zero because of the overlapping slope portions, thus resulting in the aforementioned fluctuation in density.

FIGS. 5A-5E and 6A-6E illustrate the cause of the fluctuation in density. FIGS. 5A and 6A show laser driving pulses, wherein T1 and T2 are turn-on periods. FIGS. 5B and 6B show the Gaussian distributions of the laser beam intensity I, and FIGS. 5C and 6C show corresponding exposure distributions, FIGS. 5D and 6D show the distributions of electric field intensity corresponding to the exposure distributions shown in FIGS. 5C and 6C, and FIGS. 5E and 6E illustrate output density distributions corresponding to the electric fields shown in FIGS. 5D and 6D.

If the beam turn-on time T1 is short as shown in FIG. 5A, no overlapping appears in the exposure distribution as shown in FIG. 5C. As already known well, the electrophotographic process provides a so-called edge effect, by which the edges of the image are emphasized more strongly than in the potential distribution which is determined by the exposure distribution. The exposure distribution shown in FIG. 5C provides an electric field distribution in FIG. 5D, which gives rise to a density distribution shown in FIG. 5E. Thus the obtained dot is poorer in the intermediate tone than in the exposure distribution.

On the other hand, if the beam turn-on period is long as shown in FIG. 6A, the sloping portions mutually overlap as shown in FIG. 6C to provide an exposure distribution shown by a broken line. Thus the electric field intensity distribution is also lowered as shown in FIG. 6D to provide an intermediate density. Also at the center of a dot, the density is lowered by a reduced edge effect. The density at the center of the beam turn-off period is a fluctuated density $\Delta D$ due to the aforementioned fluctuation in exposure $\Delta E$.

Thus, in the case of representing an intermediate tone in binary densities, the fluctuation in density scarcely appears in the image development if the black dot has a small area, or in a high-light area where the average density is low. However, in an area with a higher average density where the black dots have a larger area, there will result a fluctuation in the density. In this manner the fluctuation in density becomes larger as the average density increases already explained before. On the other hand, in the case of representing the intermediate tone with multiple density levels, the fluctuation in density is naturally present but can be reduced significantly if the multiple levels are used only in the highlight area. Also in the case of background development, the fluctuation in density may inversely appear in the high-light area.

FIG. 7 schematically shows the relationship between the intermediate tone image input signal N along the abscissa and the output image density D along the ordinate, wherein $D_p$ represents the density level of the recording material.

As will be apparent from FIG. 7, the output image density fluctuates more strongly in the high density area.

As explained in the foregoing, the conventional image recording apparatus has been associated with a drawback that it is incapable of stably recording an intermediate tone image in the low density area or in the high density area.

SUMMARY OF THE INVENTION

An object of the present invention is to provide an improvement in the image recording apparatus.

Another object of the present invention is to provide an image recording apparatus not associated with the drawbacks of the prior technology.

Still another object of the present invention is to provide an image recording apparatus capable of reproducing an image with a high quality.

Still another object of the present invention is to provide an image recording apparatus capable of reproducing an image with a high quality and with a simple structure.

Still another object of the present invention is to provide an image recording apparatus capable of providing an intermediate tone image without distinct pseudo contours, by providing a fluctuation in the threshold value signals.

Still another object of the present invention is to provide an image recording apparatus capable of providing an intermediate tone image without distinct pseudo contours, by providing a fluctuation in the intermediate tone image signal corrected in tonal characteristic, and comparing the image signal with threshold value signals.

Still another object of the present invention is to provide an image recording apparatus capable of forming soft black dots with reduced sharpness in the highlight area of the recorded image.

Still another object of the present invention is to provide an image recording apparatus provided with modulating means for repeated on-off modulation of a beam spot with driving pulses of a shorter interval compared with the scanning time corresponding to the beam spot diameter.

Still another object of the present invention is to provide an image recording apparatus capable of providing an intermediate tone image without fluctuation in density of the image, by varying the threshold value pattern for the high density area and for the low density area in an intermediate tone image.

Still other objects of the present invention will become fully apparent from the following description.

These objects are achieved by an image recording apparatus comprising image data input means, means for forming a pulse width modulated signal on the basis of image data input by the input means, and means for scanning a beam modulated in accordance with the pulse width modulated signal output from the forming means and for recording an image on a recording medium. The forming means is capable of forming a plurality of pulse width modulated signals so as to reproduce a variable density image. The plurality of pulse width modulated signals have the same number of pulses but different pulse widths. The scanning means effects the scanning operation thereof so that a plurality of beams modulated by the pulse width modulated signal forms spots overlapping each other.

Also provided is a level signal generating means and means for forming a binary signal by utilizing the image data inputted by the input means, the level signal generated by the level signal generating means, and a predetermined threshold value matrix. The level signal generating means generates the level signal asynchronously with each element of the predetermined threshold value matrix.

The forming means can also comprise means for generating a predetermined analog pattern and for forming the pulse width modulated signal using the image data and the analog pattern signal. The analog pattern signal generating means generates an analog pattern signal having a plurality of peak values thereof.

BRIEF DESCRIPTION OF THE DRAWINGS

FIGS. 16A to 16C are timing charts showing signals in the circuit sown in FIG. 15;

FIG. 21 is a cross-sectional view of an image recording apparatus constituting a fifth embodiment;

FIGS. 23A and 23B are schematic views of density patterns stored in a matrix memory shown in FIG. 22.

DETAILED DESCRIPTION OF THE PREFERRED EMBODIMENTS

Now the present invention will be clarified in detail by embodiments thereof shown in the attached drawings.

Figure 1:
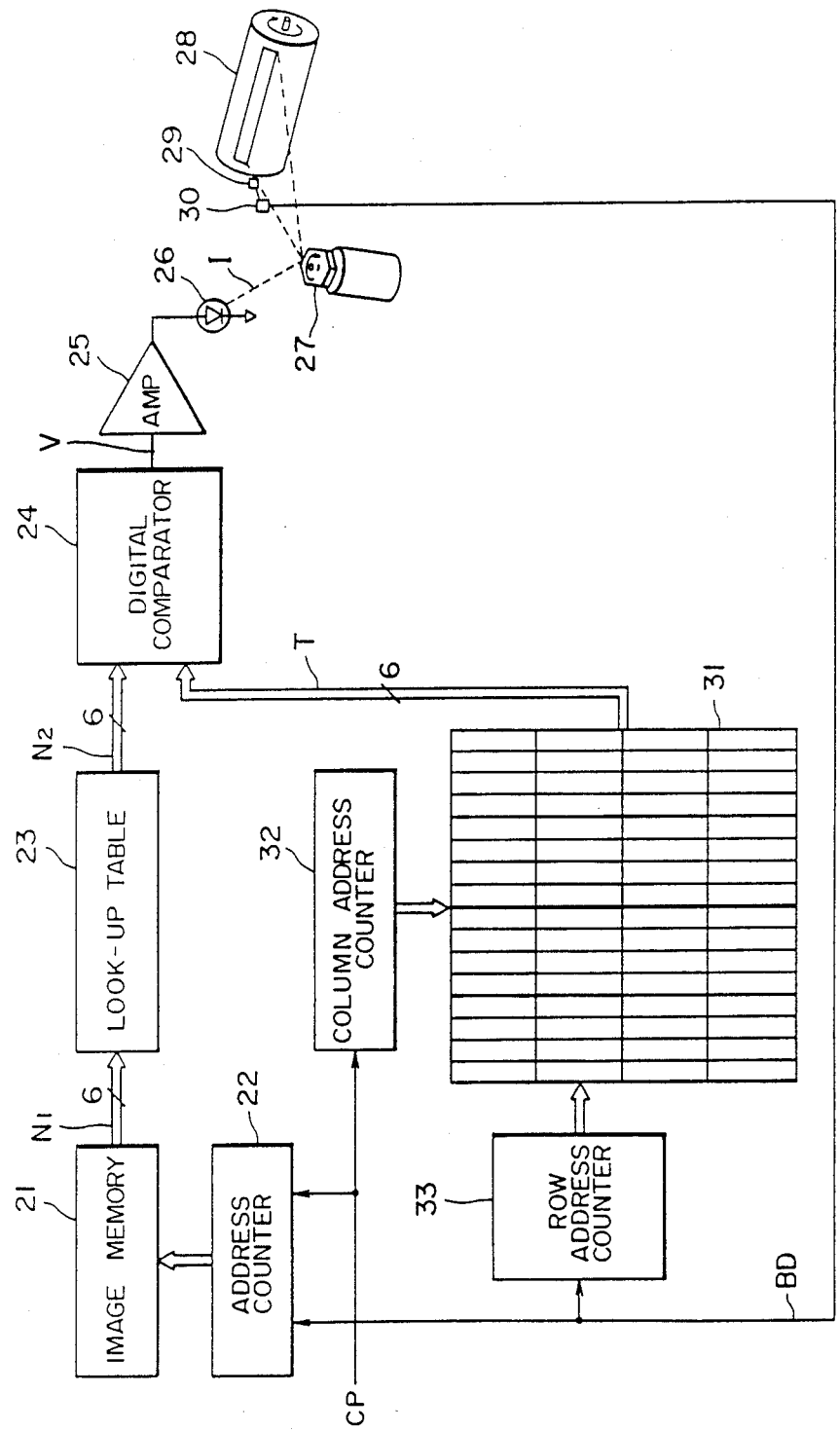
FIG. 1 is a block diagram of a conventional electrophotographic laser beam printer capable of intermediate tone image recording.
Figure 8:
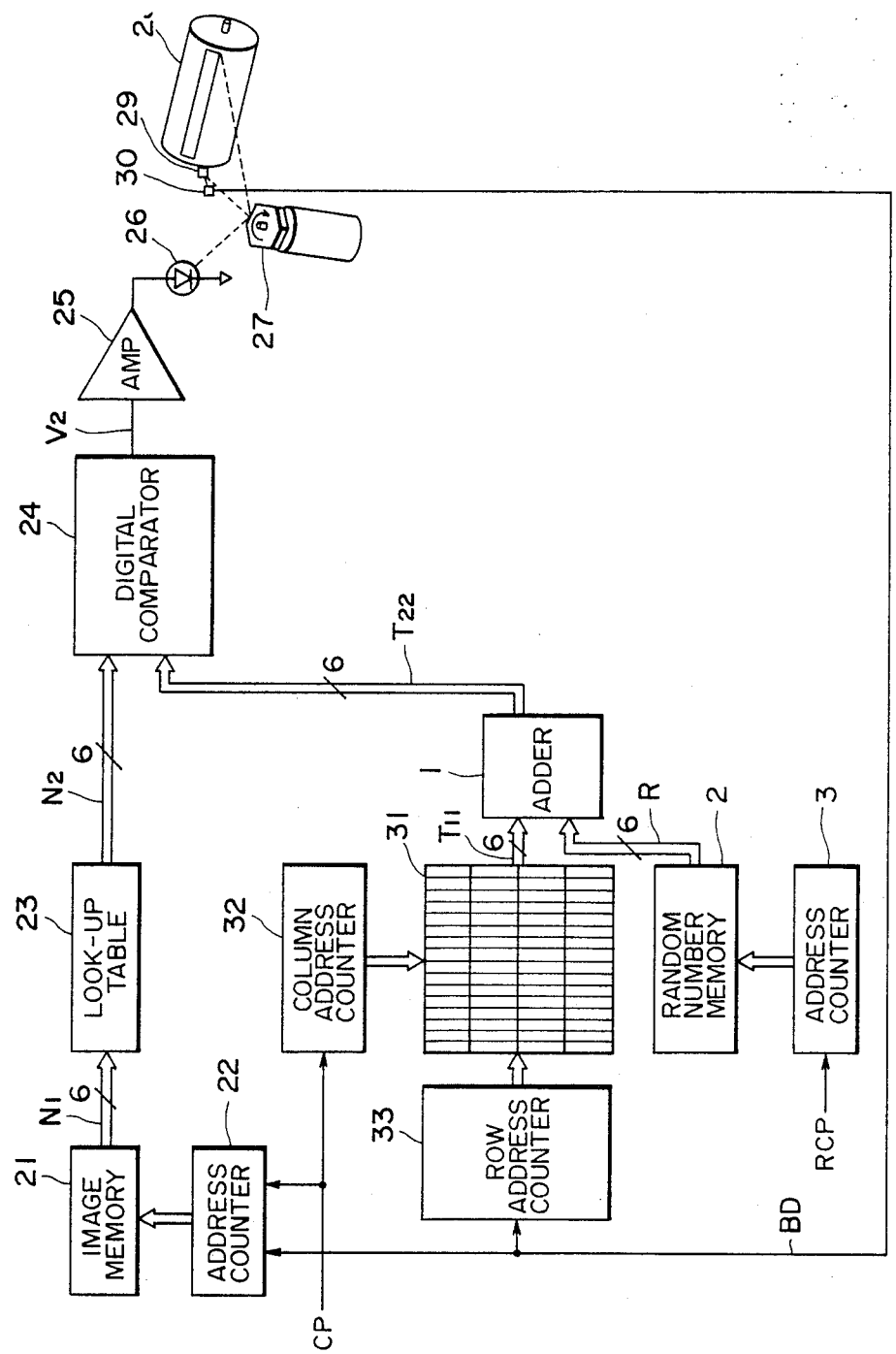
FIG. 8 is a block diagram showing a first embodiment.

FIG. 8 is a block diagram showing an electrophotographic laser beam printer adapted for intermediate tone image recording and constituting a first embodiment of the present invention, wherein the same components as those in FIG. 1 are represented by same numbers or symbols.

In FIG. 8 there is provided an adder 1 for adding a threshold value signal and a fluctuation signal. The adder 1 adds a threshold value output T11 (first dither signal) from a threshold value matrix stored in the memory 31 and a fluctuation signal R (second dither signal) from a random number memory 2 constituting an unsynchronized signal storage means to release an adder output signal T22 to a digital comparator 24. The random number memory 2 releases the fluctuation signal R from an address designated by an address counter 3 upon counting clock pulses RCP which are not synchronized with the clock pulses CP. The frequency of the clock pulses RCP is selected to be higher than the read-out frequency of the pixel data N1 to increase the spatial frequency component of the increasing noise, thereby rendering the noise inconspicuous to the eye.

Figure 9A:
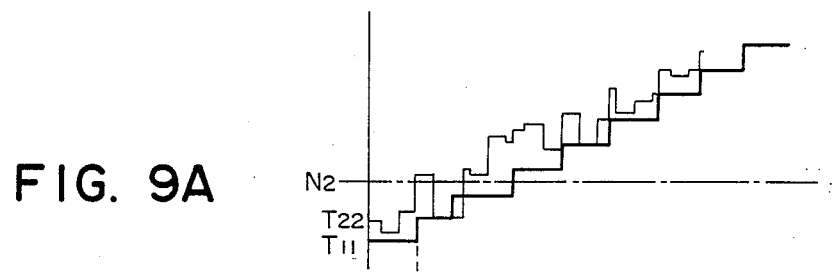
FIGS. 9A to 9C are timing charts showing various signals in the circuit shown in FIG. 8.
Figure 9B:
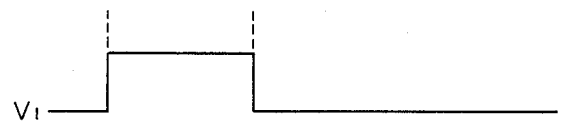
Figure 9C:
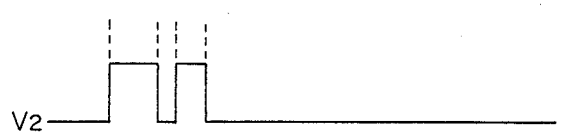

Now reference is made to FIGS. 9A to 9C for explaining the function of the circuit shown in FIG. 8.

FIGS. 9A to 9C are timing charts showing signals of the circuit shown in FIG. 8. In FIG. 9A, T11 shows the threshold value signal, while T22 indicates the adder output signal, and the level of the pixel data N2 is indicated by a chain line. In FIG. 9B, V1 indicates the output of the comparator when the fluctuation signal R is not added. In FIG. 9C, V2 indicates the output of the comparator when the fluctuation signal is added.

In the absence of the fluctuation signal R, the adder 1 releases the adder output signal T11 only, and in response to the pixel data N2 shown in FIG. 9A, the digital comparator 24 releases an output signal V1 as shown in FIG. 9B.

On the other hand, in case of addition of the fluctuation signal R, the adder 1 releases an adder output signal T22, so that the comparator output signal V2, involving the fluctuation as shown in FIG. 9C is released.

Figure 10:
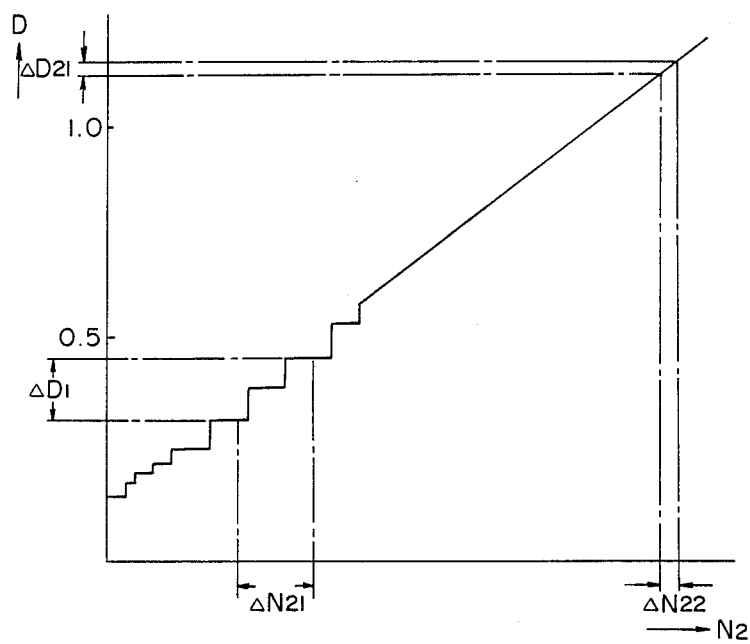
FIG. 10 is a characteristic chart showing the relation between the pixel data and output image density in the first embodiment.

FIG. 10 is a characteristic chart showing the relation between the pixel data and output image density in the first embodiment.

The addition of the fluctuation signal R to the threshold value output signal T11 is equivalent to the addition of the signal R to the pixel signal N2. As shown in FIG. 10, the fluctuation in density is equal to $\Delta D1$ or $\Delta D2$, respectively corresponding to a fluctuation $\Delta N21$ in a low density area or $\Delta N22$ in a high density area. As the pixel data follows a scale expanded in the low density area and compressed in the high density area, the fluctuation $\Delta N21$ is compressed to $\Delta N22$ in the high density area. Consequently there is obtained a relation $\Delta D2 << \Delta D1$. Thus the S/N ratio is lowered in the low density area where the tonal reproducing ability is low, but the S/N ratio is not lowered in the high density area where the tonal reproducing ability is high, so that an intermediate tone image can be obtained without distinct pseudo contours.

As explained in the foregoing, the first embodiment is provided with unsynchronized signal storage means for storing unsynchronized signals varying at a smaller pitch than the pitch of pixels of the intermediate tone image signal, and adder means for adding threshold value signal to the unsynchronized signal supplied from the unsynchronized signal storage means, thereby significantly reducing the pseudo contours still remaining even in the conventional density pattern or dither method. Thus it is rendered possible to provide an intermediate tone image with a smooth tonal rendition and to advantageously limit the inevitably resulting loss in S/N ratio to the area where the tonal reproducing ability is low.

Instead of applying fluctuation to the threshold value signal as in the first embodiment, it is also possible to apply a fluctuation to the image signal.

In the following there will be explained a second embodiment in which a fluctuation is applied to the image signal.

Figure 11:
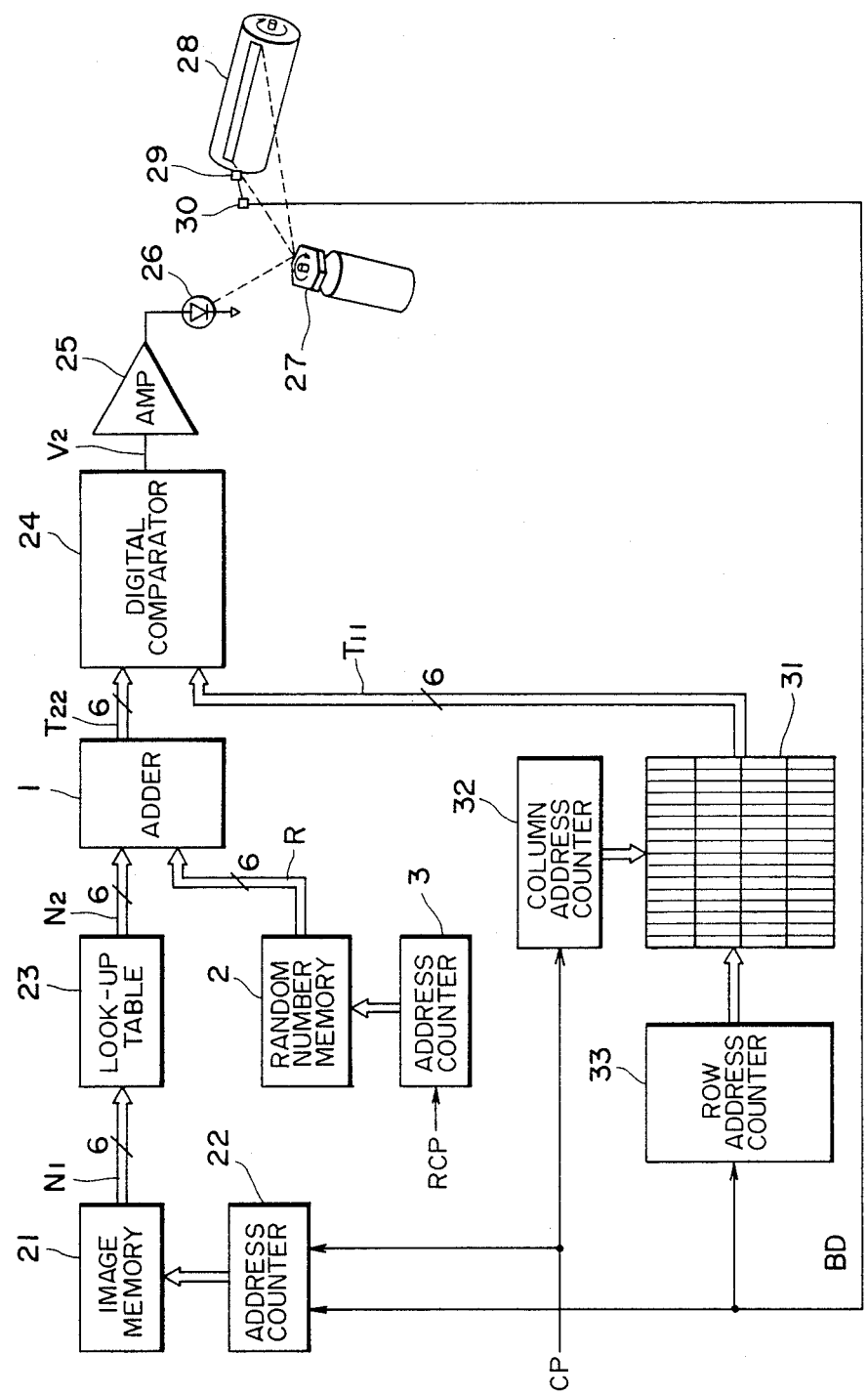
FIG. 11 is a block diagram of an image recording apparatus constituting a second embodiment.

FIG. 11 is a block diagram of the second embodiment, wherein same components as those in FIG. 8 are represented by same numbers or symbols.

In FIG. 11, the adder 1 adds the pixel data N2 supplied from the look-up table 23 and the fluctuation signal R (second dither signal) supplied from the random number memory 2 constituting the unsynchronized signal storage means, and supplies the adder output signal T22 to the digital comparator 24, which compares the signal with the threshold signal (first dither signal). The random number memory 2 releases the fluctuation signal R from an address designated by the address counter 3, upon counting the clock pulses RCP which are not synchronized with the clock pulses CP. The frequency of the clock pulses RCP is selected to be higher than the readout frequency of the pixel data N1 in order to increase the spatial frequency component of the increasing noise, thereby rendering the noise inconspicuous to the eye.

Figure 12A:
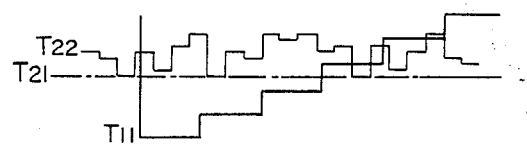
FIGS. 12A to 12C are timing charts showing the signals in the circuit shown in FIG. 11.
Figure 12B:
Figure 12C:

Now reference is made to FIGS. 12A to 12C for explaining the function of the circuit shown in FIG. 11.

FIGS. 12A to 12C are timing charts showing signals of the circuit shown in FIG. 11. In FIG. 12A, T11 shows the threshold value signal, while T21 indicates the adder output signal without addition of the fluctuation signal R, and T22 indicates the adder output signal with addition of the fluctuation signal R. In FIG. 12B, V1 indicates the comparator output signal without addition of the fluctuation signal R, and in FIG. 12C, V2 indicates the comparator output signal with addition of the fluctuation signal R.

In the absence of the addition of the fluctuation signal R, the adder 1 releases the adder output signal T21 alone, which is compared in the digital comparator 24 with a threshold value signal T11 as shown in FIG. 12A to obtain the comparator output signal V1 shown in FIG. 12B.

On the other hand, in the presence of the addition of the fluctuation signal R, the adder 1 releases the output signal T22 which is compared in the digital comparator 24 with the threshold value signal T11 to obtain the comparator output signal V2 involving fluctuation shown in FIG. 12C.

Figure 13:
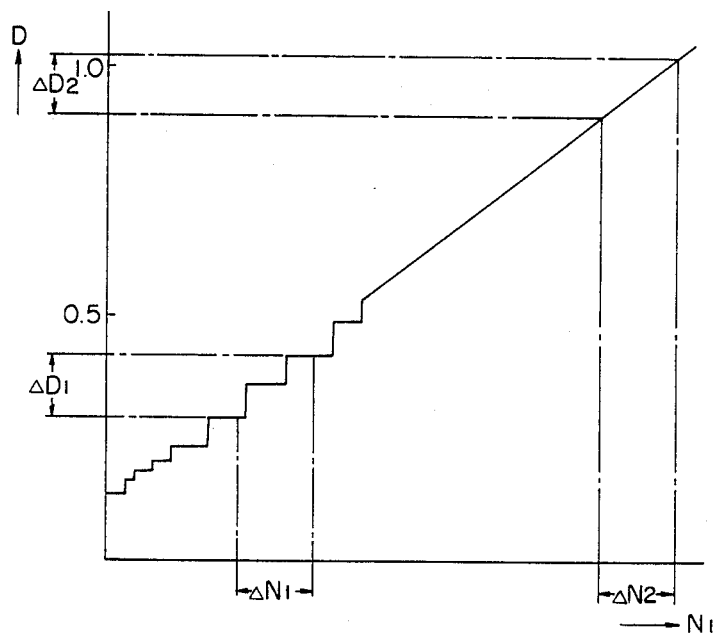
FIG. 13 is a characteristic chart showing the relation between the pixel data and the output image density when a fluctuation is provided prior to the correction of the total characteristic of the image.

FIG. 13 is a chart showing the relation between the pixel data and the output image density when the fluctuation is added prior to the correction of the tonal characteristic of the image.

Figure 2:
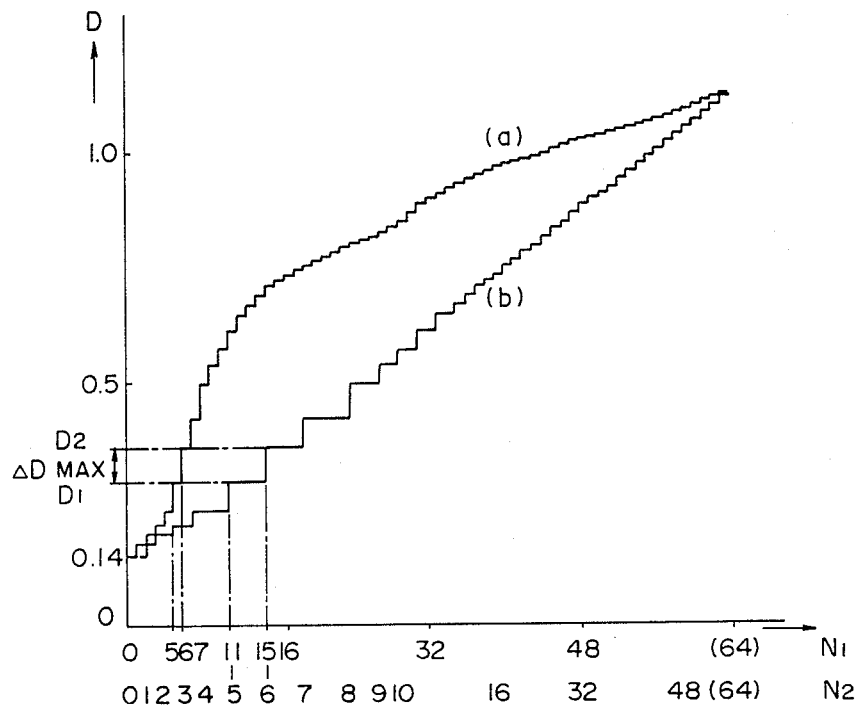
FIG. 2 is a characteristic chart showing the relation between image data N1, N2 and output image density D.

As will be apparent from FIG. 13, a fluctuation $\Delta N1$ applied to the pixel data N1 results in a fluctuation $\Delta D1$ in density, and, since the pixel data follows a linear scale, the fluctuation $\Delta N2$ in the high density area becomes equal to $\Delta N1$. The fluctuation in density can be made small in the high density area because of the high tonal reproducing ability as shown in FIG. 2, but the fluctuation is applied in the same manner as in the low density area where the tonal reproducing ability is low, whereby the S/N ratio is lowered over the entire density range.

Figure 14:
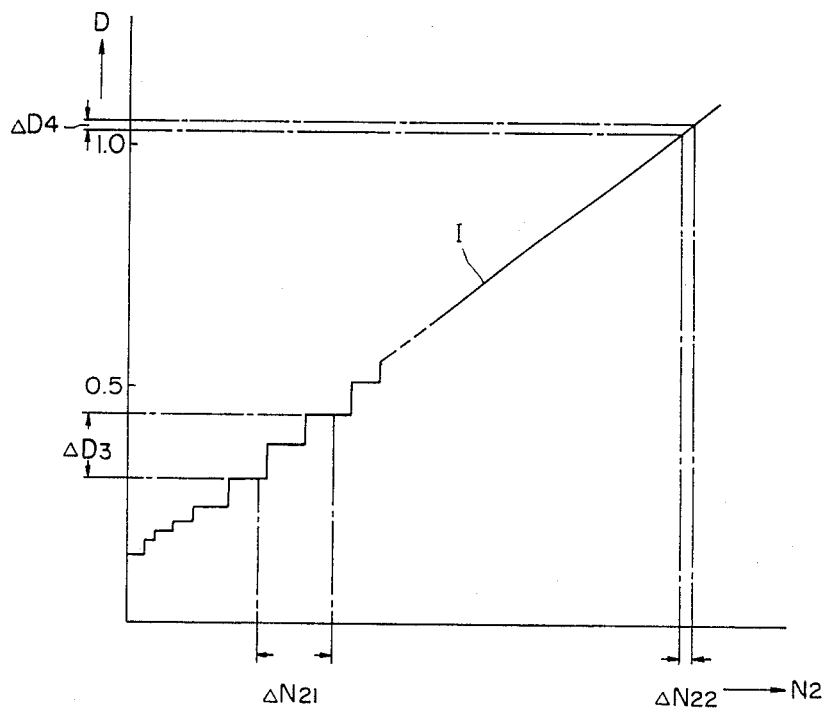
FIG. 14 is a characteristic chart showing the relation between the pixel data and the output image density in the second embodiment.

However, the second embodiment provides a density characteristic shown in FIG. 14, due to the presence of the adder 1 behind the look-up table 3.

FIG. 14 is a characteristic chart showing the relation between the pixel data and the output image density obtained in the second embodiment.

In FIG. 14, a curve I shows the pixel data N2 involving the addition of the fluctuation signal R.

As shown in FIG. 14, the fluctuation in density is equal to $\Delta D3$ for a fluctuation $\Delta N21$ in a low density area and $\Delta D4$ for a fluctuation $\Delta N22$ in a high density area. Since the pixel data N2 follows a scale expanded in the low density area and compressed in the high density area, the fluctuation $\Delta N21$ is compressed to $\Delta N22$ in the high density area, thus satisfying a relation $\Delta D3 >> \Delta D4$. Therefore, though the S/N ratio is lowered in a low density area where the tonal reproducing ability is low, the S/N ratio is not lowered in a high density area where the tonal reproducing ability is high, and there can be obtained an intermediate tone image without conspicuous pseudo contours.

In the foregoing first and second embodiments the fluctuation signal is generated from the random number memory 2, but it is also possible obtain the fluctuation signal by amplifying thermal noises or the like. However, in case of adding thermal noise in digital manner, there is required an A/D converter. Also in the first and second embodiments, the fluctuation signal R is added by the adder 1 but the signal may be subtracted. However addition is simpler than subtraction in hardware structure. Also the modification of the fluctuation signal R may be achieved either by a change in the content of the random number memory 2, or by a bit shift of the signal R prior to the supply to the adder 1. In the first and second embodiments, the clock pulses Cp, RCP are not synchronized, in order to prevent the formation of periodic patterns or texture.

In the following there will be explained a third embodiment for turning on and off the beam spot with driving pulses of a shorter interval, compared with the scanning time corresponding to the diameter of the laser beam spot.

Figure 15:
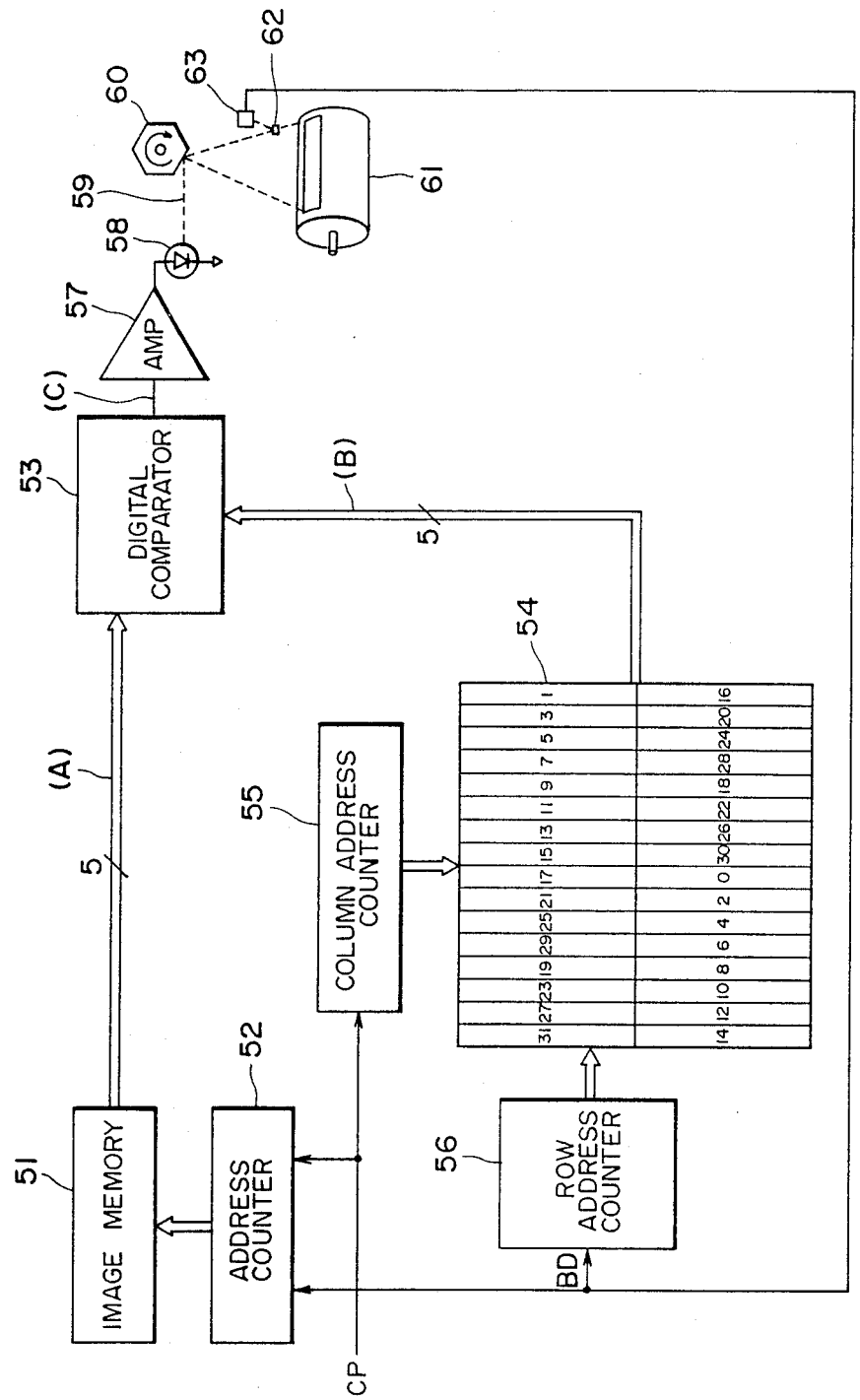
FIG. 15 is a block diagram of an image recording apparatus constituting a third embodiment.

FIG. 15 is a block diagram of modulating means employed in an image recording apparatus constituting the third embodiment. In FIG. 15 there are provided an image memory 51 for storing a pixel signal, containing for example 5 bits per pixel, supplied from an unrepresented external apparatus; an address counter 52 for designating the address of the image memory 51 by counting clock pulses CP and a horizontal synchronization signal BD to be explained later; a digital comparator 53 for comparing the pixel signal A with a threshold value signal B supplied from a memory 54 and supplying an output pulse C to an amplifier 57 when the former is larger; a column address counter 55, composed for example of a hexadecimal counter, for determining the column address of the memory 54; a row address counter 56, composed for example of a binary counter, for designating the threshold value in the sub scanning direction by counting the horizontal synchronization signal BD; a semiconductor laser 58 of which emitted laser beam 59 scans a photosensitive drum 61 by means of a rotary polygonal mirror 60; and a mirror 62 for guiding a part of the laser beam 59 to a photodetector 63.

In the following there will be explained the function of the above-explained third embodiment.

The image memory 51 releases a pixel signal A of an address designated by the address counter 52 counting the clock pulses CP and the horizontal synchronization signal BD. Thus the digital comparator 53 receives the pixel signal A at an input terminal, and the threshold value B, released from the memory 54 storing the threshold value matrix, at the other input terminal. The comparator 53 compares the signals A with B, and, if the latter is larger, releases an output pulse C of a level "1", which is amplified by the amplifier 57 and drives the semiconductor laser 58. The emitted beam 59 is reflected by the rotary polygonal mirror 60 to scan the photosensitive drum 61 in the main scanning direction. When the beam 59 reflected by the mirror 62 enters the photodetector 63, a horizontal synchronization signal BD is supplied to the row address counter 56 and the address counter 52. In this manner said signal BD indicates the scanning position of the laser beam.

The memory 54 is constructed as a 16×2 matrix, and the matrix as a whole corresponds to a pixel. The control is made in such a manner that about ¼ of the matrix corresponds to the diameter of the laser beam. The threshold value B is released according to the density pattern method. The column address of the memory 54 is designated by the counting of the clock pulses CP with the column address counter 55, while the row address thereof is designated by the counting of the horizontal synchronization signal BD by the row address counter 56. Consequently the address counter 52 designates a pixel in succession in the main scanning direction upon every 16 counts of the clock pulses CP, and in the sub scanning direction upon every 2 counts of the horizontal synchronization signal BD.

FIGS. 16A to 16C are timing charts showing signals in the circuit shown in FIG. 15, wherein FIG. 16A shows the pixel signal A released from the image memory 51, while FIG. 16B shows the threshold value signal B released from the memory 54, and FIG. 16C shows the pulse signal C released from the comparator 53. An arrow 65 indicates the distance corresponding to a pixel, and another arrow 66 indicates the diameter 4σ of the laser beam.

As an example, the pixel signal released from the image memory 51 has a level "28", the digital comparator 53 compares the signal with the threshold values B from the memory 54 in the order of 31, 27, 23, 19, 19, . . . , 1, and, if the signal B is higher, the pulse output signal C is released. The pulse activates the semiconductor laser 58 for example twice in a period shorter than the diameter 4σ of the laser beam. For this reason softer blurred black dots are formed in the high-light area.

Figure 17A:
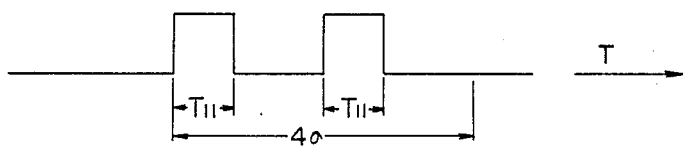
FIGS. 17A and 17B are waveform chart showing the function of the modulating means shown in FIG. 15.
Figure 17B:
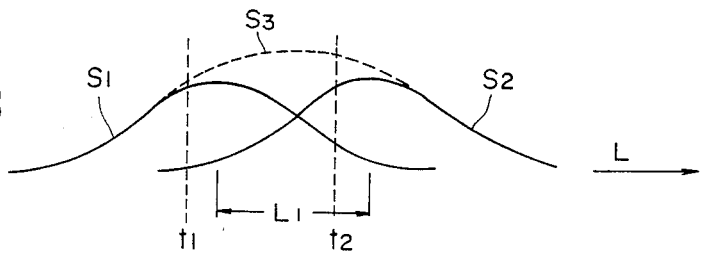
Figure 18:
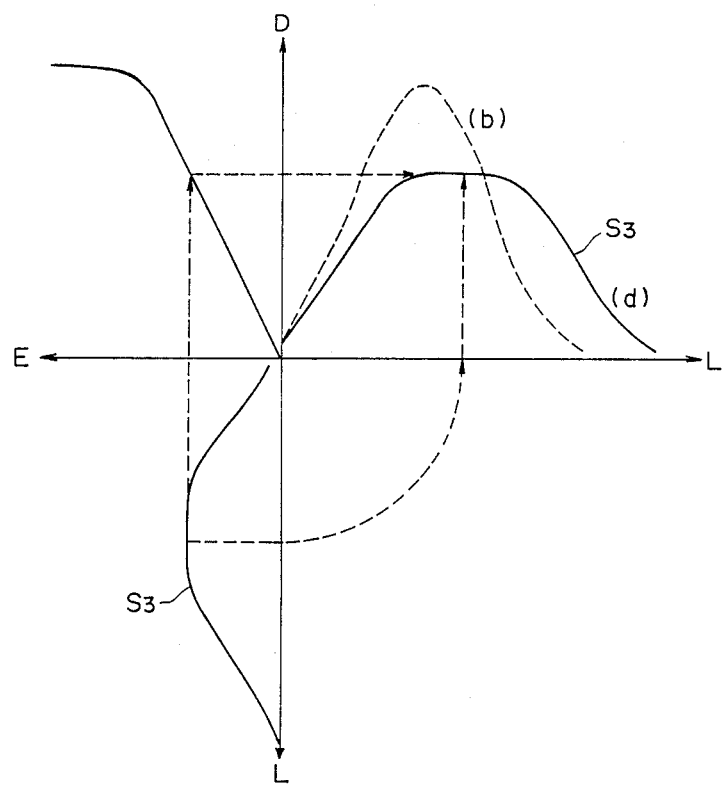
FIG. 18 is a chart showing the density characteristic corresponding to the exposure distribution shown in FIG. 17B.

Now reference is made to FIGS. 17 and 18 for explaining the function of the modulating means shown in FIG. 15.

FIGS. 17A and 17B are waveform charts showing the function of the modulating means shown in FIG. 15, wherein FIG. 17A indicates the output pulse C while FIG. 17B shows exposure distributions s1, s2 at times t1, t2 and a combined exposure distribution s3. T11 indicates the turn-on period of the laser beam. Symbols that are the same as those in FIG. 16B have the same meanings.

FIG. 18 shows the density characteristic corresponding to the exposure distribution shown in FIG. 17B, wherein the first quadrant indicates the output density D along the scanning direction in ordinate as a function of distance L along the abscissa. The second quadrant indicate the density along the ordinate as a function of the exposure D along the abscissa, in a recording system such as an electrophotographic process. In FIG. 17B, the same symbols as those in FIG. 3 have same meanings.

Figure 3A:
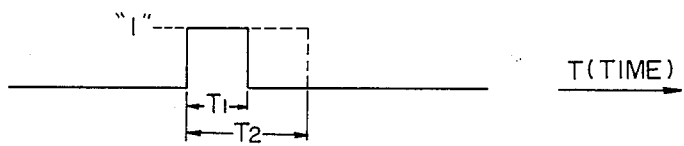
FIGS. 3A to 3D are charts showing the exposure distribution characteristic of pulse width modulation.
Figure 3B:
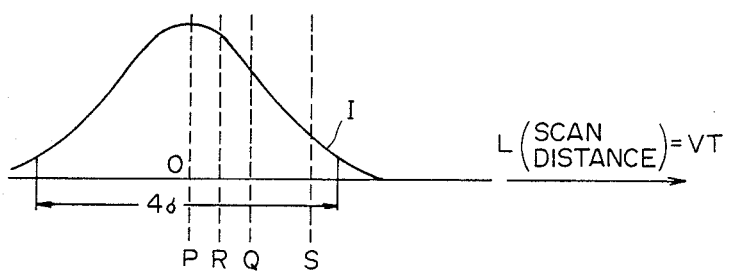
Figure 3C:
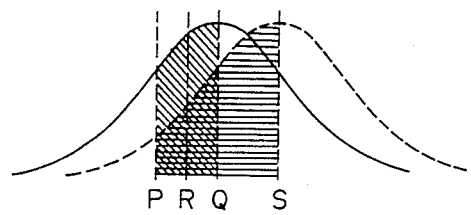
Figure 3D:
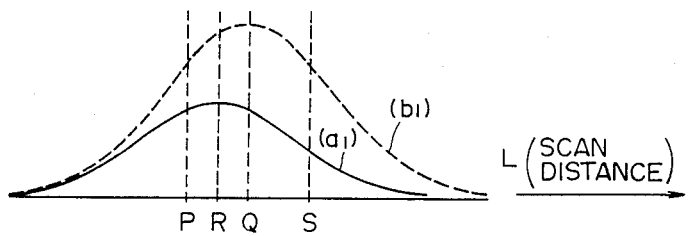
Figures 4, 5:
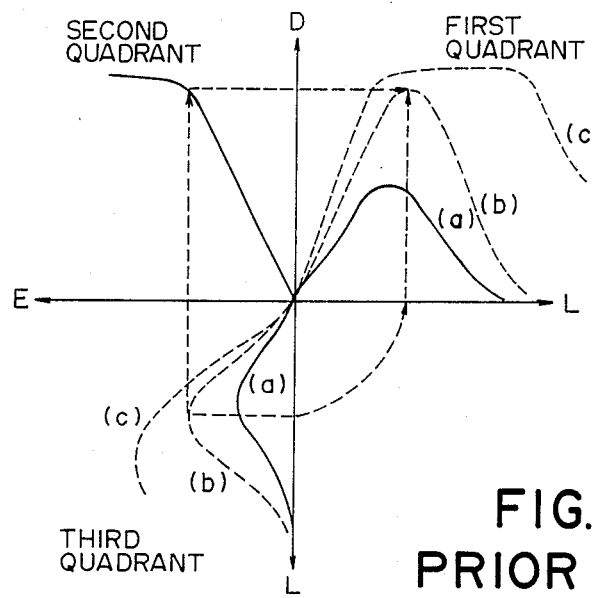
FIG. 4 is a chart showing a density characteristic of an image.
Figure 5A:
FIGS. 5A to 5E and 6A to 6E are charts showing the cause of fluctuation in density of an image.
Figure 5B:
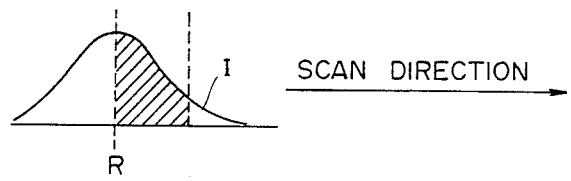
Figure 5C:
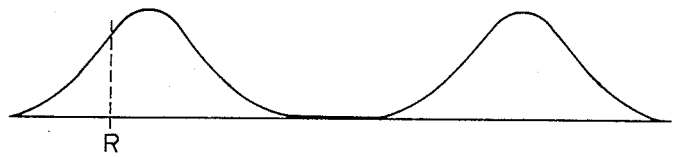
Figure 5D:
Figure 5E:
Figure 6A:
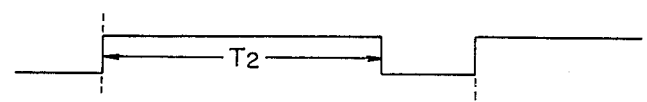
Figure 6B:
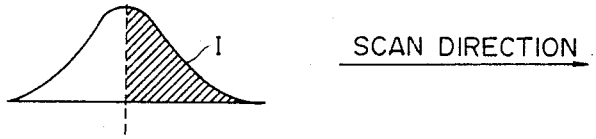
Figure 6C:
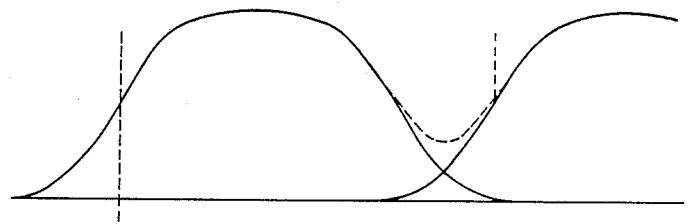
Figure 6D:
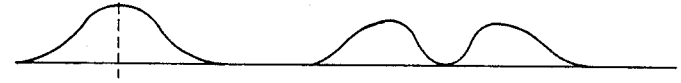
Figure 6E:
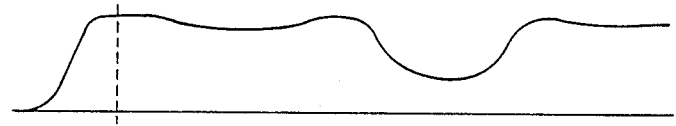
Figures 6, 7:
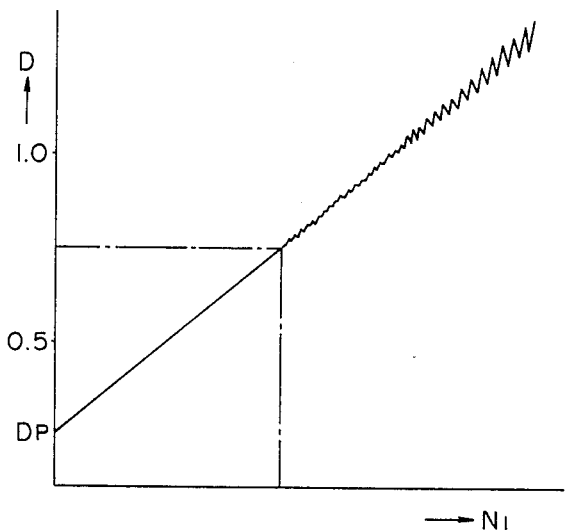
FIG. 7 is a chart showing the relation between an intermediate image signal and output image density.

In FIG. 18, the area of the combined exposure distribution curve s3 (curve (d)) is not equal to that of a curve (b) because of the non-linear E-D characteristic, but they can be made equal through the regulation of the laser beam turn-on period T1 shown in FIG. 3A and of the laser beam turn-on period T11 shown in FIG. 17A.

As will be apparent from FIG. 18, even if the average density is same, the combined exposure distribution curve s3 shows a lower density and a larger area than in the curve (b). As a result, a black dot formed with the former is blurred and less conspicuous to the eye. Also the density obtainable with the distribution curve s3 increases as the beam turn-on period T11, shown in FIG. 17A, is made gradually longer. Thus, in the conventional technology, the increase in average density is caused by the growth in size of small high-density dots, but in the present invention it is caused by the growth in density of large low-density dots.

Though the foregoing third embodiment employs digital threshold value signals, it is also possible to conduct the comparison with analog signals.

In the following there will be explained a fourth embodiment employing analog threshold value signals.

Figure 19:
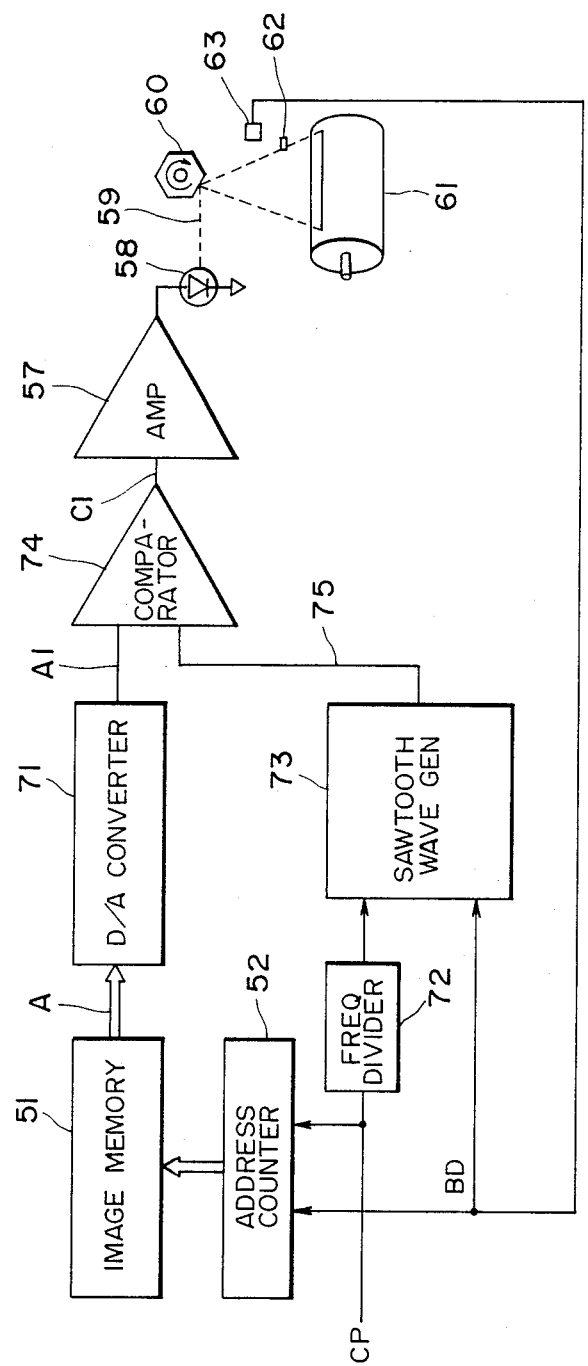
FIG. 19 is a block diagram of an image recording apparatus constituting a fourth embodiment.

FIG. 19 is a block diagram of an image recording apparatus constituting the fourth embodiment wherein same components as those in FIG. 15 are represented by same numbers or symbols.

In FIG. 19 there are provided a D/A converter 71 for D/A conversion of the pixel signal supplied from the image memory 51 to provide an analog signal Al; a frequency divider 72 for dividing the frequency of the clock pulses CP; a sawtooth generator 73 for generating a sawtooth signal 75 to be explained later, from the output signal of the frequency divider 72 and a horizontal synchronization signal BD, wherein the sawtooth signal is synchronized with the synchronization signal BD; and a comparator 74 for comparing the analog signal A1 with the sawtooth wave signal 75 and supplying a pulse output signal Cl to the semiconductor laser 58 when the former is higher.

Figure 20A:
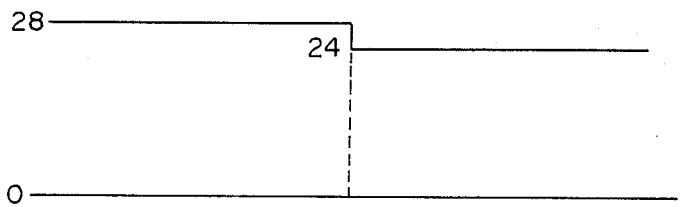
FIGS. 20A to 20C are timing charts showing signals in the circuit shown in FIG. 19.
Figure 20B:
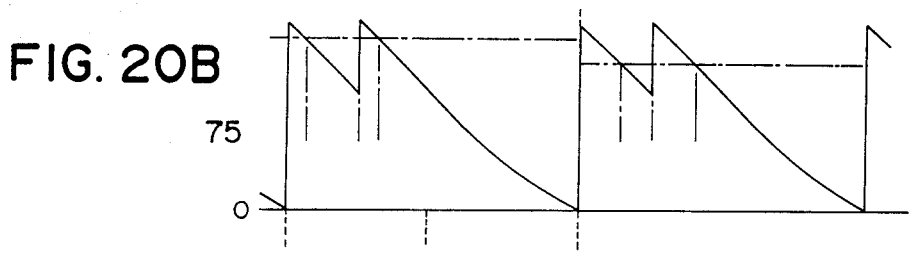
Figure 20C:
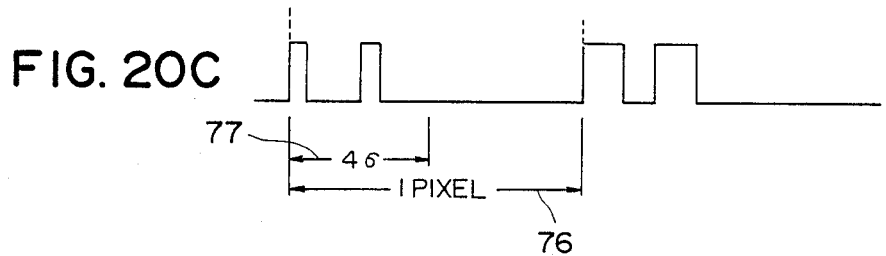

FIGS. 20A to 20C are timing charts of signals in the circuit shown in FIG. 19, wherein FIG. 20A indicates the pixel signal A released from the image memory 51, while FIG. 20B indicates the sawtooth wave signal released from the generator 73, and FIG. 20C indicates the pulse signal Cl released from the digital comparator 53. An arrow 76 indicates the distance corresponding to a pixel, and an arrow 77 indicates the diameter 4σ of the laser beam. Though a sawtooth wave is employed as the analog pattern signal in the present embodiment, it is also possible to employ analog pattern signal of other forms.

Pulse width modulation with an analog sawtooth wave 75 as shown in FIG. 20, being capable of continuously varying the pulse width, has the advantage of theoretically-obtaining an infinite number of density levels, but it is difficult to generate an arbitrary waveform with an analog circuit. Also the frequency of the sawtooth wave 75 becomes as high as several MHz in practice, so that the S/N ratio deteriorates and the pulse width is not constant for the same density level.

In the foregoing third and fourth embodiments the pulse width modulation is conducted according to the density pattern method, but it is also possible to cause each pixel to correspond to ¼ of the memory 54 and to achieve an intermediate state between the density pattern method and the dither method, as disclosed in the Japanese Patent Laid-open No. 99867/1982 by designating the pixel in succession, in the main scanning direction at every 8 counts of the clock pulses by the address counter 52 and in the sub-scanning direction at every 1 count of the horizontal synchronization signals BD.

Also in the foregoing third and fourth embodiments, the laser beam is turned on and off twice at a shorter interval in comparison with the diameter of the laser beam, but the number of turning on and off is not limited to two. It is to be noted that a sufficient blur of the black dot can be obtained with two switchings of the laser beam. In this manner it is rendered possible to blur black dots in the high-light area of the image and to achieve image recording with a smooth intermediate tone reproduction.

In the following there will be explained a fifth embodiment in which the threshold value pattern is modified between a low density area and a high density area of an intermediate tone image.

FIG. 21 is a cross-sectional view of an image recording apparatus constituting a fifth embodiment, wherein provided are a photosensitive drum 101; a primary charger 102; a secondary charger 103; a transfer charger 104; a charge pre-eliminator 105; a developing cylinder 106; a developing unit 107; toner 108; a separating roller 109; a separating unit 110; fixing rollers 111, 112; a fixing heater 113; registration rollers 114, 115; discharge rollers 116, 117; a sheet feeding roller 118; a sheet cassette 119; a recording sheet 120 constituting a recording medium; transport rollers 121, 122, 123, 124; a conveyor belt 125; a sheet tray 126, a rotary polygonal mirror 127; an f-θ lens 128; a laser beam 129; movable guide plates 130, 131; fixed guide plates 132–141; a modulating unit 151 for turning on and off a laser 152; and a collimating lens 153 for converting the laser beam 152a emitted from the laser 152 into a parallel beam. The image forming operation is conducted according to a known electrophotographic process and will not be explained in detail.

In the following there will be explained the operation of transporting a recording sheet in the fifth embodiment.

The recording sheet 120 in the cassette 119 is forwarded therefrom by the rotation of the feed roller 118. At this point the movable guide plate 130 is in the full-lined position, and the recording sheet 120 waits at this position. The registration rollers 114, 115 start to rotate with a delay from the release of the image signal from the modulating unit 151 in response to a start signal, and introduce the recording sheet 120 toward the photosensitive drum 1. The recording sheet 112 receives the toner transferred by the transfer charger 104, and is fixed by the fixing rollers 111, 112 and the fixing heater 113. In this state the movable guide plate 131 is in the full-lined position, so that the recording sheet 120 is forwarded toward the guide 140, then returned by the conveyor belt 125, and inserted again into the registration rollers 114, 115 by the transport rollers 123, 124. Subsequently the recording sheet 120 is subjected again to the toner transfer and fixing as explained above. In these operations, the position of the image on the sheet 120 is controlled by the timing of start of rotation of the registration rollers 114, 115. In this state the modulating unit 151 releases an image signal different from that in the first operation. After the toner transfer and fixing are repeated for a determined number of times, the movable guide plate 131 is shifted to a broken-lined position, whereby the recording sheet 120 is forwarded to the tray 126 by the discharge rollers 116, 117. In the case of conducting another image formation, the movable guide plate 130 returns to the full-lined position and a new recording sheet 120 is fed.

Figure 22:
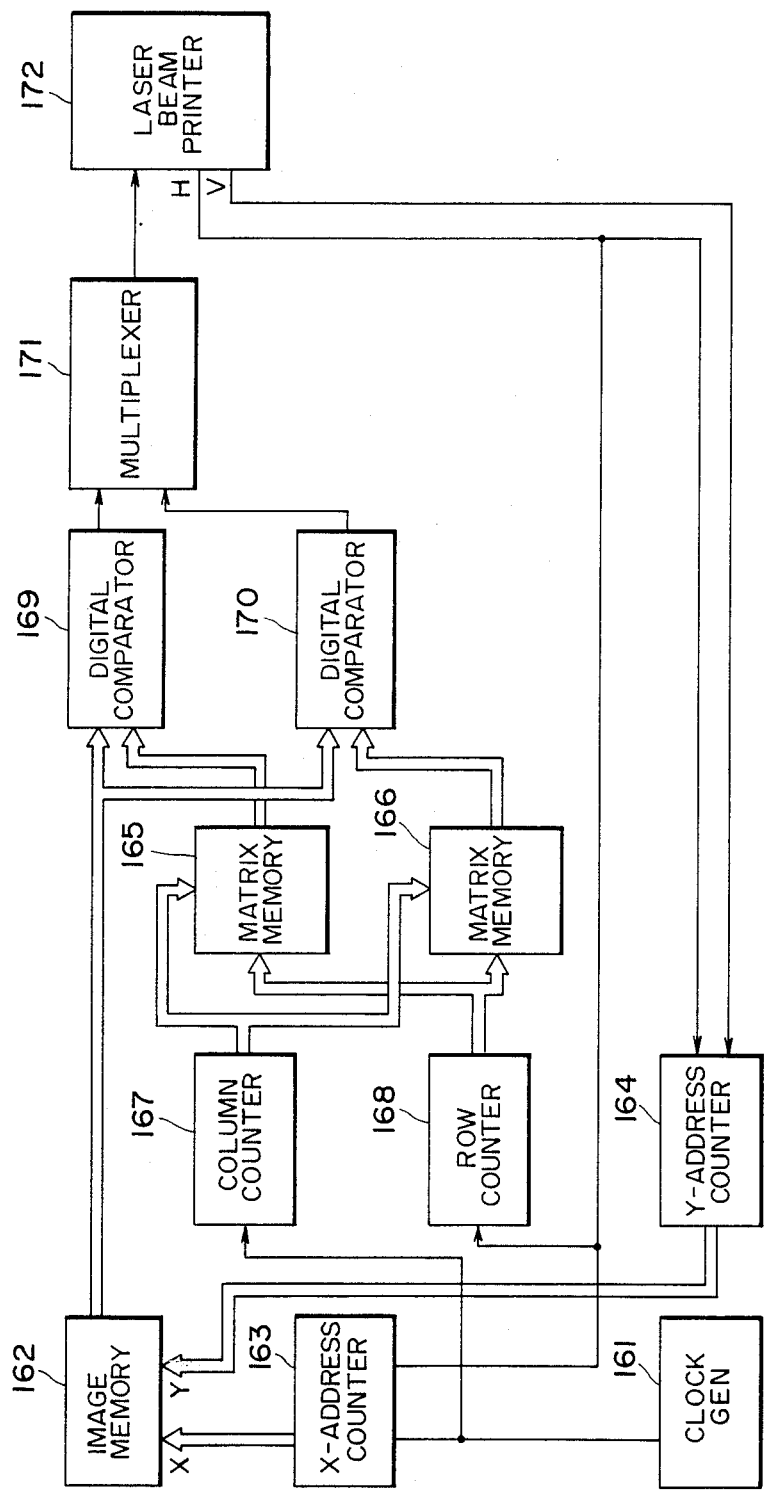
FIG. 22 is a block diagram of a modulating device shown in FIG. 21.

Now reference is made to FIG. 22 for explaining the structure of the modulating unit 151 shown in FIG. 21.

Figures 23A, 23B:
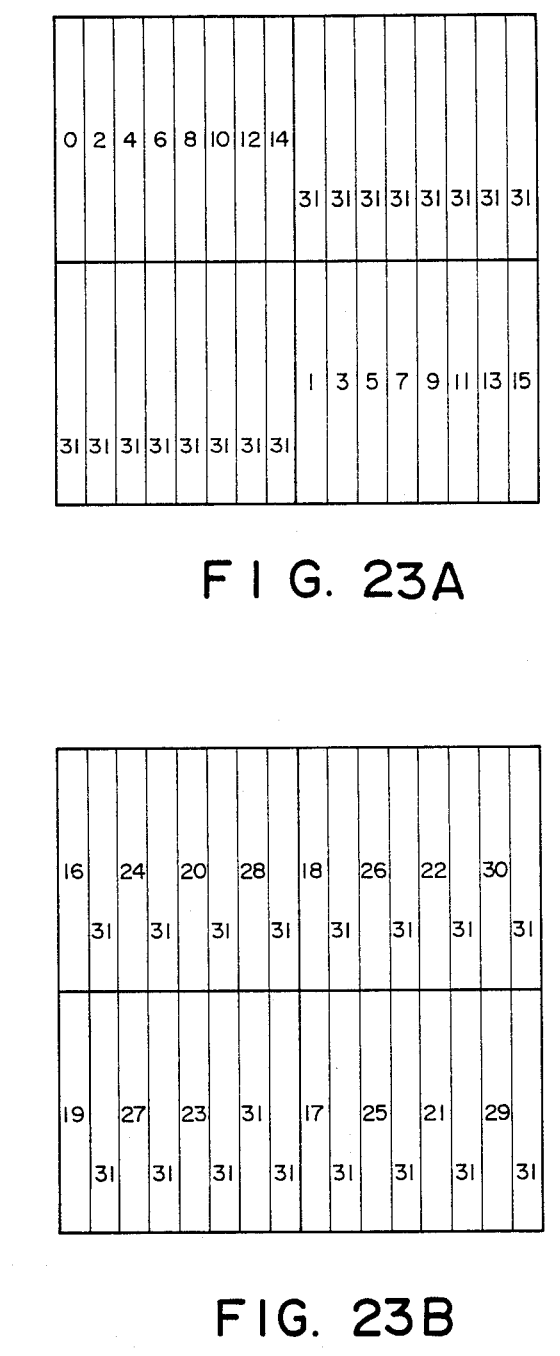

FIG. 22 is a block diagram of the modulating unit 151 shown in FIG. 21, wherein provided are a clock generator 161 for generating timing clock signals CLK; an image memory 162 storing pixels in addresses (X, Y) designated by an X-address counter 163 and a Y-address counter 164, wherein each pixel contains density information of 32 levels from 0 to 31 in which 31 stands for black; matrix memories 165, 166 respectively storing a 16×2 threshold value matrix, i.e. a dot formation density pattern and a multi-value density pattern respectively shown in FIGS. 23A and 23B; a hexadecimal column counter 167 for designating the column address of the matrix memories 165, 166; a binary row counter 168 for designating the row address of the matrix memories 165, 166; digital comparators 169, 170 for comparing the pixel data stored in the image memory 162 with the threshold values of the patterns stored in the matrix memories 165, 166 and supplying a determined black signal to a laser printer 172 through a multiplexer 171 in the presence of a pixel data exceeding the threshold value; and a laser printer 172 capable of generating a start signal V and a horizontal synchronization signal H. The horizontal synchronization signal H can be easily generated by detecting the scanning beam 129 at a position outside the effective image area.

The start signal V can be generated at an arbitrary timing, and the registration rollers 114, 115 are started with a certain delay therefrom, in order to synchronize the binary image signal received by the laser printer 172 with the position of the recording sheet 120. The X-, and Y-address counters 163, 164 are reset by the start signal V generated by the laser printer 172. The X-address counter 163 counts the timing clock pulses CLK generated by the clock generator 161 to advance the X-address of the image memory 162. Also the timing clock pulses CLK are counted by the column counter 167 to advance the column addresses of the matrix memories 165, 166. The Y-address counter 164 counts the horizontal synchronization signals H generated by the laser printer 172 to advance the Y-address of the image memory 162, and the signals are also counted by the row address counter 128 to advance the row addresses of the matrix memories 165, 166.

The pixel data of the image memory 162 designated by the X- and Y-address counters 163, 164 is compared in the digital comparators 169, 170 with the threshold values of the matrix memories 165, 166 designated by the column counter 127 and the row counter 168, and, if the former is larger, black signals are released from said comparators 169, 170. The multiplexer 171 selects either of the output signals of the comparators 169, 170 and sends thus a selected signal as a binary image signal to the laser beam printer 172. The signal is used for driving the laser 152 thereby recording a binary image on the photosensitive drum 101 and forming a binary image on the recording sheet 120. The matrix memories 165, 166 respectively store different threshold value matrices, and, in each process explained in relation to FIG. 21, the multiplexer 171 selects the comparator 169 or 170. Consequently, in the present embodiment, the data of the image memory 162 are used twice. In the circuit shown in FIG. 22, it is also possible to place the multiplexer 171 in front of the digital comparators 169, 170 and to employ only one digital comparator, thereby selecting the output signals of the matrix memories 165, 166 by the multiplexer 171 and supplying the thus selecting signal to the digital comparator.

Now reference is made to FIGS. 23(a) and (b) for explaining the density patterns stored in the matrix memories 165, 166 shown in FIG. 22.

FIGS. 23(a) and (b) are schematic views of the density patterns stored in the matrix memories 165, 166 shown in FIG. 22, wherein (a) is a dot forming density pattern in which threshold values corresponding to a dot of a density pixel signal are finely divided in the main scanning direction, while (b) is a multi-level density pattern in which threshold values corresponding to a dot of pixel data are finely divided in the main scanning direction. In the dot forming pattern shown in FIG. 23 (a), the density varies in a range of the pixel data from level 0 to 16, but the density remains same at level 17 or higher. In the multi-level density pattern shown in FIG. 23(b), the laser 152 is not turned on by the pixel data of level 16 or lower, and the density varies in a range from level 17 to 31.

Figure 24:
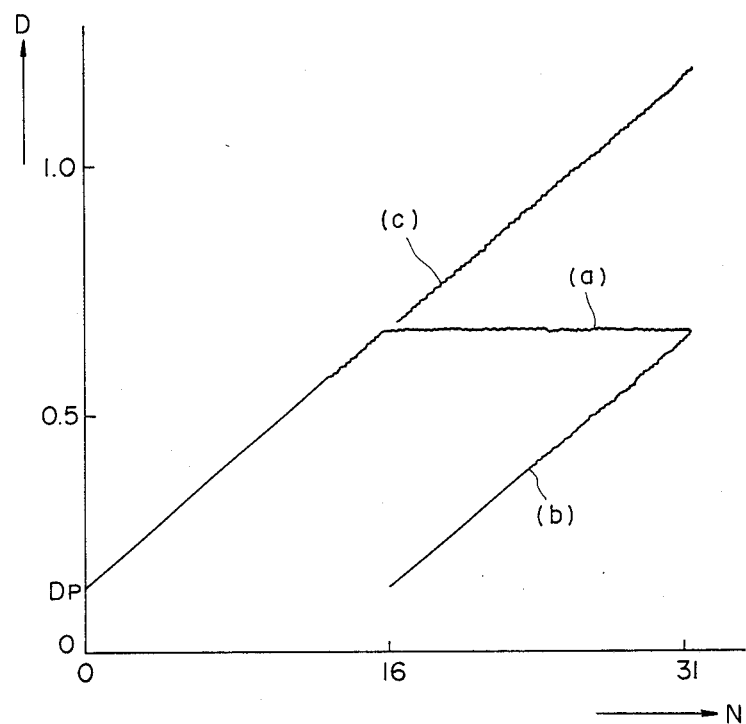
FIG. 24 a characteristic chart showing the output image density obtained by density patterns shown in FIGS. 23A and 23B.

Now reference is made to FIG. 24, for explaining the output image density obtained with the density patterns shown in FIGS. 23(a) and (b).

FIG. 24 is a characteristic chart showing the output image density D along the ordinate, obtainable by the density patterns shown in FIGS. 23(a) and (b) as a function of the level N of the entered pixel data along the abscissa. $D_P$ indicates the density level of the recording material.

In FIG. 24, a curve (a) indicates the output image density characteristic obtained by the dot forming pattern shown in FIG. 23(a), while a curve (b) indicates the output image density characteristic obtained by the multi-level density pattern shown in FIG. 23(b), and a curve (c) indicates the combined density characteristic of the image formation by the curves (a) and (b).

An output image density corresponding to the curve (a) in FIG. 24 can be obtained by converting, among the entered pixel data, those of low density levels, for example level 16 or lower, into a binary image by means of the dot forming density pattern shown in FIG. 23 (a). In this case the fluctuation in density can be minimized since the conversion into a binary image is conducted in a density range before such fluctuation appears. The pixel data components exceeding level 17 are converted into binary image signals by the multi-level density pattern shown in FIG. 23(b). In this case an output image density corresponding to the curve (b) in FIG. 24 is obtained.

Consequently, an image with reduced density fluctuation, having an output image density characteristic of the curve (c) in FIG. 24 can be obtained by at first forming an image with the dot forming density pattern shown in FIG. 23(a), and then forming an image with the multi-level density pattern shown in FIG. 23(b) by a desired number of times on a same recording sheet 120.

In practice the relation between the entered pixel data and the output image density is not linear as shown in FIG. 24, but such linear relationship can be attained by inserting a look-up table behind the image memory 162 shown in FIG. 22.

If the electrophotographic process is repeated plural times with the dot forming density pattern, the image quality is significantly deteriorated due to the moire pattern caused by incomplete registration. In the present embodiment, the formation of such a moire pattern is prevented by forming an image once with the dot forming density pattern and thereafter forming other images with another multi-level density pattern. Also in case of driving the laser 152 with the multi-level density pattern shown in FIG. 23(b), the laser 152 is turned on for short durations at a pitch shorter than the diameter of the laser beam, thereby regulating the amount of exposure and thus reproducing an intermediate tone. Furthermore, in certain cases, the multi-level density pattern shown in FIG. 23(b) may be unable to reproduce a large number of levels, so that the slope of the curve (c) shown in FIG. 24 may not be steep enough. In such a case the electrophotographic process may be repeated twice or more with the multi-level density pattern shown in FIG. 23(b) in order to obtain an image density as shown by the curve (c) in FIG. 24.

In the foregoing fifth embodiment, the image is obtained by repeating a process, including image transfer and fixing, plural times, but it is also possible to provide a transfer drum between the photosensitive drum 101 and the recording sheet 120 for synthesizing the images on the transfer drum and then transferring the thus synthesized images onto the recording sheet, thereby dispensing with the re-feeding mechanism for the recording sheet and reducing the time required for recording.

It is furthermore possible to simplify the mechanism and to reduce the recording time by providing plural photosensitive drums 101 respectively corresponding to different density patterns and transferring images from the drums to the recording sheet As explained in the foregoing, the fifth embodiment is provided with modulating means for converting a low density component of the intermediate tone image signal into binary image signal according to a dot forming density pattern, and other component of said intermediate tone image signal into binary image signal according to a multi-level density pattern, thereby enabling one to obtain an image of the high density area of the intermediate tone image by the image formation in the low density area, thus obtaining an intermediate tone reproduced image without a fluctuation in density in the high density range.

Though the foregoing embodiments have been limited to electrophotographic laser beam printers, the present invention is applicable to all other printers.

Also the present invention is not limited to the foregoing embodiments but is subject to various modifications within the scope and spirit of the appended claims.

What is claimed is:

1. An image recording apparatus comprising:
  image data input means;
  forming means for forming a plurality of pulse width modulated signals having the same number of pulses but different pulse widths, in a unit region, so as to reproduce a variable density image on the basis of a density level of image data input by said input means; and
  scanning means for scanning a beam modulated in accordance with the pulse width modulated signals output from said forming means and recording an image on a recording medium;
  wherein said scanning means effects a scanning operation thereof so that said beam modulated by said pulse width modulated signals forms spots overlapping each other.

2. An image recording apparatus according to claim 1, wherein said forming means is adapted to form the pulse width modulated signal by utilizing a predetermined threshold value matrix.

3. An image recording apparatus according to claim 1, wherein said forming means is adapted to form the pulse width modulated signal by utilizing a predetermined analog pattern signal.

4. An image recording apparatus according to claim 2, wherein said recording means comprises means for detecting the scanning position of said beam, and said forming means is adapted to generate a threshold value signal corresponding to said threshold value matrix in response to the output of said detecting means.

5. An image recording apparatus according to claim 3, wherein said recording means comprises means for detecting the scanning position of said beam, and said forming means is adapted to generate said analog pattern signal on the basis of the output of said detecting means.

6. An image recording apparatus comprising:
  image data input means;
  level signal generating means; and
  forming means for forming a binary signal to reproduce a gradation image by utilizing the image data inputted by said input means, the level signal generated by said level signal generating means, and a predetermined threshold value matrix;
  wherein said level signal generating means generates the level signal asynchronously with each element of the predetermined threshold value matrix.

7. An image processing apparatus according to claim 6, wherein said generating means is adapted to generate level signals of different values.

8. An image processing apparatus according to claim 7, wherein said forming means comprises means for performing operation on said image data and said level signal, and comparator means for forming a pulse width modulated signal by comparing the result of operation by said performing means with each threshold value of said threshold value matrix.

9. An image processing apparatus according to claim 7, wherein said forming means comprises means for generating a threshold value signal corresponding to each threshold value of said threshold value matrix, means for processing said threshold value signal and said level signal, and comparator means for forming a pulse width modulated signal by comparing the result of the processing performed by said performing means with said image data.

10. An image processing apparatus according to claim 7, wherein said generating means is adapted to generate said level signal unsynchronously with said image data.

11. An image processing apparatus according to claim 10, wherein the frequency of said level signal is higher than that of said image data.

12. An image processing apparatus according to claim 7, further comprising means for correcting the tonal characteristics of the image data inputted by said input means, wherein said forming means is adapted to form a pulse width modulated signal by utilizing the output of said correcting means, said level signal and said predetermined threshold value matrix.

13. An image processing apparatus according to claim 7, wherein said level signal generating means generates the level signal in response to a first clock pulse signal, wherein said image data input means inputs image data in response to a second clock pulse signal, wherein said forming means comprises means for generating a threshold signal corresponding to each threshold value of the threshold value matrix in response to the second clock pulse signal, and wherein the first clock pulse signal is generated asynchronously with the second clock pulse signal.

14. An image recording apparatus according to claim 1, wherein said scanning means includes drive means for driving a semiconductor laser for emitting a beam, in response to said pulse width modulated signals.

15. An image recording apparatus according to claim 1, wherein said image data represents an image comprising a plurality of pixels, wherein said image data input means inputs image data for each pixel, and said forming means is capable of forming a plurality of pulse width modulated signals consecutively with respect to one pixel.

16. An image recording apparatus according to claim 4, wherein said image data represents an image comprising a plurality of pixels, and wherein said image data input means inputs image data for each pixel and all of the elements of said threshold value matrix correspond to one pixel.

17. An image recording apparatus according to claim 5, wherein said analog pattern signal is a sawtooth signal.

18. An image apparatus comprising:
image data input means;
forming means for forming a pulse width modulated signal on the basis of a density level of image data input by said input means to reproduce a gradation image;
wherein said forming means comprises means for generating a predetermined analog pattern signal, and for forming the pulse width modulated signal using the image data and the analog pattern signal; and
wherein said analog pattern signal generating means generates an analog pattern signal having a plurality of peak values having the same polarity in one period thereof.

19. An image processing apparatus according to claim 18, wherein said image data input means comprises digital-to-analog converting means for converting digital input image data to an analog output image signal, and wherein said forming means comprises means for comparing the analog image signal with the analog pattern signal and thus forming the pulse width modulated signal.

20. An image processing apparatus according to claim 19, further comprising means for scanning a beam modulated in accordance with the pulse width modulated signal output from said forming means and recording an image on a recording medium, wherein said scanning and recording means comprises means for detecting the scanning position of the beam, and wherein said analog pattern signal generating means is adapted to generate said analog pattern signal on the basis of the output of said detecting means.

21. An image processing apparatus according to claim 20, further comprising means for inputting a clock pulse signal, wherein said image data input means inputs image data in response to the clock pulse signal, and said analog pattern signal generating means generates an analog pattern signal in accordance with the clock pulse signal and an output from said detecting means.

22. An image processing apparatus according to claim 20, wherein said forming means is capable of forming a plurality of pulse width modulated signals having the same number of pulses but different pulse widths, in a unit region, so as to reproduce a variable density image on the basis of a density level of image data input by said input means; and
wherein said scanning means effects a scanning operation thereof so that said beam modulated by said pulse width modulated signals forms spots overlapping each other.

23. An image recording apparatus according to claim 18, wherein said analog pattern signal is a sawtooth signal.

24. An image recording apparatus according to claim 22, wherein said image data represents an image comprising a plurality of pixels, wherein said image data input means inputs image data for each pixel, and said forming means is capable of forming a plurality of pulse width modulated signals consecutively with respect to one pixel.

* * * * *